(12) United States Patent
McBrien et al.

(10) Patent No.: US 12,066,452 B2
(45) Date of Patent: Aug. 20, 2024

(54) DENSIMETER

(71) Applicant: Hamilton Sundstrand Corporation, Charlotte, NC (US)

(72) Inventors: Gary M. McBrien, S. Glastonbury, CT (US); Frank Perrelli, East Haven, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 569 days.

(21) Appl. No.: 17/303,924

(22) Filed: Jun. 10, 2021

(65) Prior Publication Data

US 2022/0397504 A1   Dec. 15, 2022

(51) Int. Cl.
   *G01N 9/32*      (2006.01)
   *G01N 9/26*      (2006.01)

(52) U.S. Cl.
   CPC ............... *G01N 9/32* (2013.01); *G01N 9/26* (2013.01)

(58) Field of Classification Search
   CPC .. G01N 9/32; G01N 9/26; G01N 7/00; G01N 11/08; G01N 2291/02818; G01N 9/04; G01N 9/266; G01F 3/16
   USPC ........................................................ 73/32 R
   See application file for complete search history.

(56) References Cited

U.S. PATENT DOCUMENTS

| | | | |
|---|---|---|---|
| 2,222,551 A | 11/1940 | Herbert et al. | |
| 4,067,381 A | 1/1978 | Lord | |
| 7,600,417 B2 * | 10/2009 | Paradise | F01D 17/08 73/114.42 |
| 8,549,863 B2 | 10/2013 | Brocard et al. | |
| 9,303,563 B2 | 4/2016 | Veilleux, Jr. et al. | |
| 9,546,941 B2 * | 1/2017 | Rasmussen | F02D 41/0025 |
| 2001/0037689 A1 * | 11/2001 | Krouth | F15B 15/2838 73/861.52 |
| 2013/0019673 A1 * | 1/2013 | Sroka | E21B 49/08 73/152.55 |
| 2016/0281708 A1 | 9/2016 | Kammerstetter et al. | |

FOREIGN PATENT DOCUMENTS

| | | |
|---|---|---|
| EP | 0890828 A1 | 1/1999 |
| WO | WO2020188059 A1 | 9/2020 |
| WO | 2021086419 A1 | 5/2021 |
| WO | WO-2021086419 A1 * | 5/2021 ......... G01F 25/0015 |

OTHER PUBLICATIONS

Extended European Search Report for EP Application No. 22177929.1, Dated Oct. 21, 2022, pp. 11.
Tison Sa: Flow Metrology Support and Digital Mfcsii, Solid State Technology, Pennwell Corporation, Tulsa, OK, US,vol. 41, No. 8, Aug. 1, 1998 (Aug. 1, 1998), XP000768902, ISSN: 0038-IIIX '*abstract** p. 74 *.

* cited by examiner

*Primary Examiner* — Marrit Eyassu
(74) *Attorney, Agent, or Firm* — Kinney & Lange, P. A.

(57) ABSTRACT

A method of determining density of a fluid within a system includes actuating a piston of a hydraulic cylinder at a target velocity. Additionally, the method includes determining differential pressure and volumetric flow rate of the fluid flowing through an orifice under actuation of the piston. The density of the fluid is determined based on the first differential pressure and the volumetric flow rate of the fluid, which is used by the system to regulate a mass flow rate of fluid within the system.

18 Claims, 5 Drawing Sheets

DENSIMETER

BACKGROUND

Modern gas turbine engines rely on accurate regulation of fuel mass flow to increase power to weight ratio, improve fuel efficiency, reliability, engine life, and respond to rapid power changes, among other desirable characteristics. Conventionally, metering valves have been used to deliver the requested fuel mass flow to the engine in proportion to the operational speed of the engine. Temperature and pressure variances, whether induced by external conditions or caused by internal operating conditions of the engine, may lead to density and viscosity changes of the fuel during operation, and thereby vary the fuel mass flow rate delivered to the engine by the metering valve. Additionally, fuel properties differ among fuel types, and the fuel may include batch-to-batch variations, each leading to fuel mass flow differences. Further advances of modern gas turbine engines may be achieved through additional monitoring of fuel properties, in particular, fuel density. However, to date, additional means for monitoring the density of fuel internal to an operational engine does not have sufficient reliability for incorporation into gas turbine engines.

SUMMARY

An exemplary methodology in accordance with this disclosure includes actuating a piston of a hydraulic cylinder at a target velocity and determining differential pressure and volumetric flow rate of the fluid flowing through an orifice under actuation of the piston. The density of the fluid is determined based on the first differential pressure and the volumetric flow rate of the fluid, which is used by the system to read a mass flow rate of fluid within the system. In another example in accordance with this disclosure, the methodology additionally includes receiving a feedback signal indicative of a position or a velocity of the piston and varying a position of a control valve based on the feedback signal to maintain the target velocity.

An exemplary system in accordance with this disclosure includes a hydraulic cylinder and a piston translatable within the hydraulic cylinder by fluid extracted from the system. The system includes a pressure transducer arranged to determine a differential pressure of fluid flowing through an orifice under actuation of the piston. A controller includes a processor and computer readable memory encoded with instruction that, when executed by the processor, cause the system to perform steps of the methodology.

DETAILED DESCRIPTION

Figure 1A:
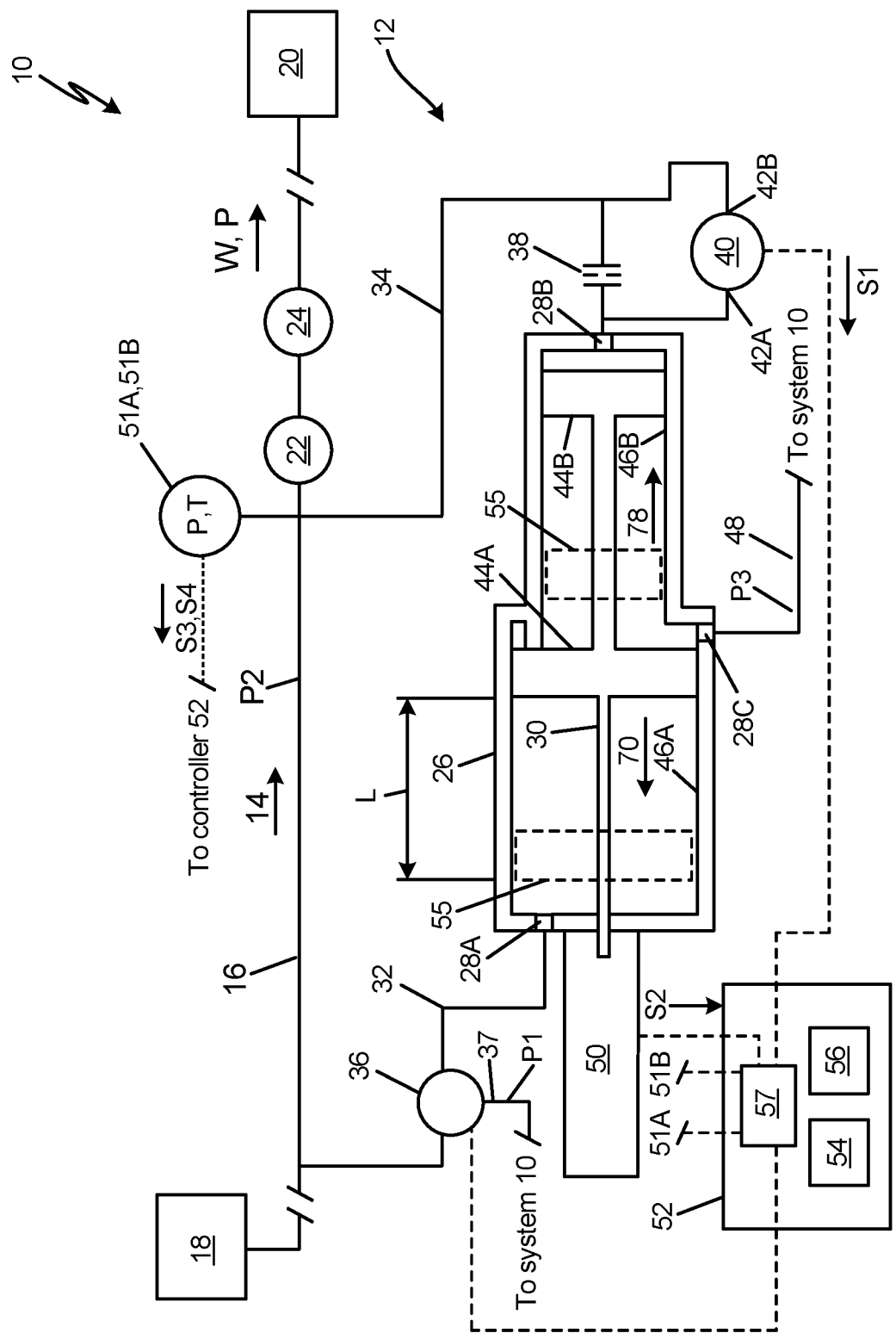
FIG. 1A and FIG. 1B are schematic representations of a system incorporating a densimeter.

As disclosed herein, a densimeter determines density of a fluid circulated during a process, in particular, during operation of a gas turbine engine fuel system. The densimeter includes two lines, each communicating with opposite sides of a hydraulic cylinder and communicating with the fuel system. Positioned along one of the lines, the densimeter includes an orifice, which produces a fluid pressure drop as the fluid flows through the orifice under actuation of the hydraulic cylinder. The densimeter includes a control valve positioned along one of the lines regulating the delivery of the fuel to the hydraulic cylinder and, as such, an actuation velocity of the hydraulic cylinder. From the cross-sectional area of the piston as well as the piston velocity, the volumetric flow rate of the fluid flowing through the orifice can be determined. The volumetric flow rate is used in conjunction with a differential pressure determined across the orifice to calculate fluid density. The fluid control system uses fluid density=to account for a mass flow variance caused by temperature and viscosity variations of the fluid during operation of the system. Accordingly, systems incorporating a densimeter of this type or of one the variations described below, provide a cost-effective, robust device to determine density of fluid within a system and improve accuracy of the fluid mass flow determined by the system.

While the following disclosure describes the densimeter in the context of a gas turbine engine fuel system, aspects of the densimeter are useful for any machine or process benefiting from mass flow rate delivery that accounts for density and viscosity variations of the fluid. The rugged and robust densimeter mechanism is another feature of the system, which allows the densimeter to withstand high-pressure exposure and high-pressure cycling of the system. This allows the densimeter to be connected directly to the high-pressure inlet of the metering valve so that the density can be measured at the inlet to the valve. This arrangement reduces errors compared to other arrangements where density might be measured at another location but used for metering at a higher pressure location.

Gas turbine engine fuel systems illustrate the advantages of incorporating a densimeter into the system. Within these fuel systems, the fuel density generally increases as the fuel pressure increases. However, the fuel density may vary between different fuel types. For instance, fuel types can be composed of different constituents or different ratios of the same constituents that produce different fuel densities. Batch-to-batch variations or variations in the manufacturing process of the same fuel type may introduce fuel density variation. Environmental factors, such as air and water entrainment into the fuel, may introduce another source of fuel density variation. Measuring the fuel density with a densimeter directly accounts for predictable, systematic changes of the fuel density caused by the fuel pressure as well as unpredictable variations due to the fuel composition and other environmental factors.

Figure 1B:
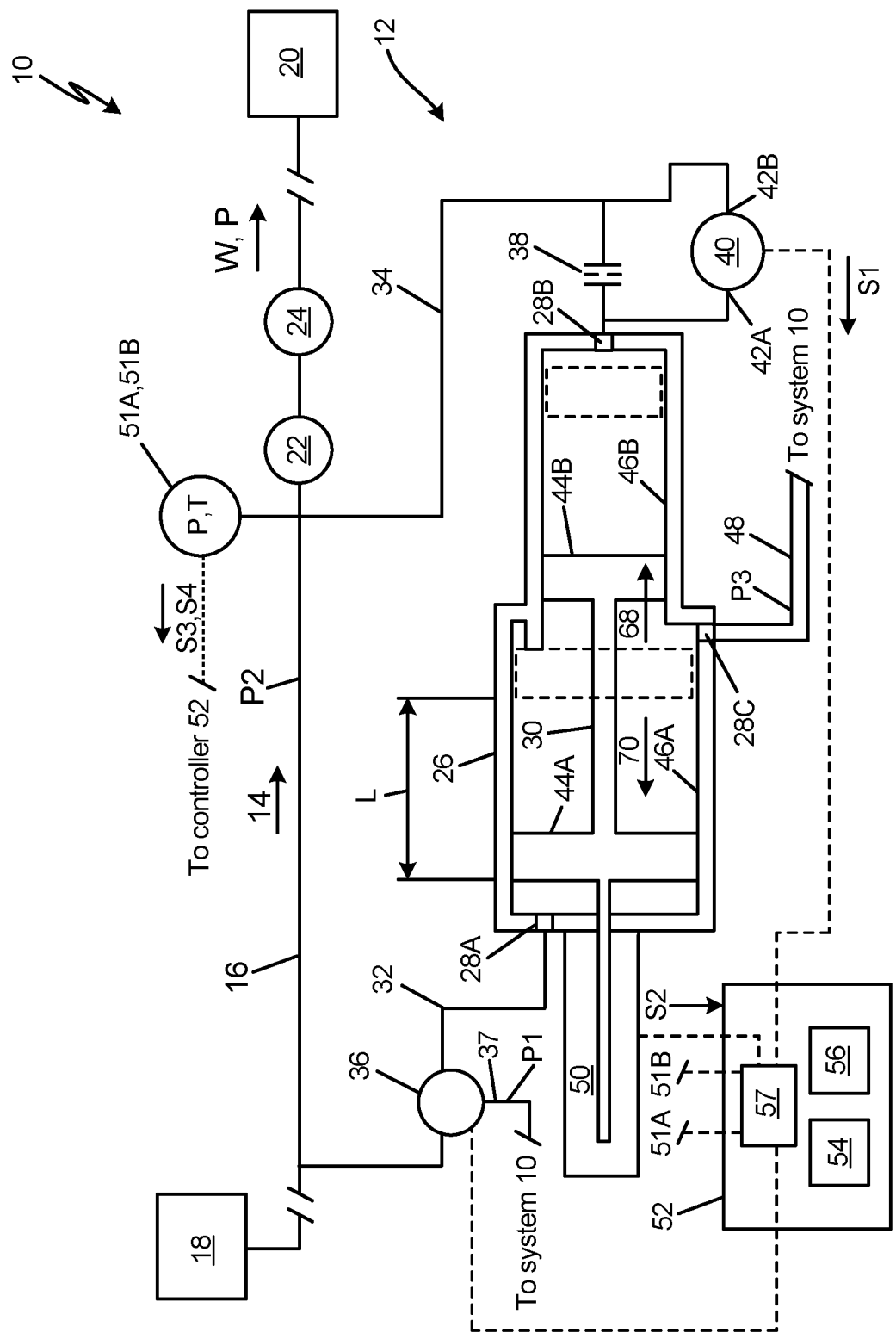

FIGS. 1A and 1B depict an exemplary embodiment of system 10 incorporating densimeter 12. System 10 provides fluid 14 along line 16 from fluid source 18 to fluid destination 20 at mass flow rate W. System 10 includes metering valve 22 that regulates mass flow rate W of fluid 14 delivered to destination 20 along line 16. Optionally, system 10 can include throttling valve 24 downstream from metering valve 22. Varying an open area of throttling valve 24 changes a pressure of fluid 14, enabling system 10 to regulate mass flow rate W and pressure P delivered to destination 20.

While only a portion of system 10 is depicted in the figures, system 10 can include additional components such as one or more pumps, filters, valves, sensors, accumulators, reservoirs, sumps, circuits and/or networks of lines interconnecting components of the system in a desired configuration. For instance, system 10 can be a fuel system for a gas turbine engine in which fluid 14 is fuel supplied along line 16 from a fuel tank or other fuel storage at source 18 to a gas turbine engine combustor at destination 20. Components typical of gas turbine engine fuel systems include low-pressure and high-pressure pumps for increasing the fuel pressure prior to metering valve 22, which operates to regulate mass flow rate W delivered to the engine at destination 20. Excess fuel supplied to an inlet side of metering valve 22 may return to the fuel tank or source 18 via an overflow or surplus fuel line as is known in the art. Further, the fuel system may supply a portion of the excess fuel to other systems. For example, aircraft engine fuel systems can include one or more auxiliary circuits that supply fuel to actuators. The actuators can control the angular positions of compressor inlet guide vanes, variable stator vanes, bleed valves, and other variable components of the engine.

Densimeter 12 includes hydraulic cylinder 26 equipped with ports 28A and 28B arranged on opposite sides of piston 30. Ports 28A and 28B place hydraulic cylinder 26 in fluid communication with system 10 via lines 32 and 34, which may communicate with any line of system 10 upstream of metering valve 22 or other flow-regulating components. In the embodiment depicted by FIGS. 1A and 1B, lines 32 and 34 each communicate with line 16, which, in this case, contains fluid at pressure P2, a high-pressure region relative to return lines or other lower pressure regions of system 10. System 10 further benefits from locating junctions of lines 32 and 34 near metering valve 22. This arrangement reduces fluid variations between the sample location and the inlet of metering valve 22. However, densimeter 12 may be deployed at other sample locations within system 10 for which density information of fluid 14 can be advantageous.

Densimeter 12 includes control valve 36 positioned along line 32 between system 10 and hydraulic cylinder 26 to selectively place port 28A of hydraulic cylinder 26 in fluid communication with line 16 or return line 37. Line 37 may redirect fluid 14 to source 18 or another low-pressure region (i.e., pressure P1) of system 10 relative to pressure P2 within line 16. Control valve 36 can be a proportional valve or, in some embodiments, a servo valve, each capable of varying an open area of valve 36 in fluid communication with port 28A. As shown, control valve 36 is a three-position, three-port electrohydraulic servo valve. In a first position shown by FIG. 1A, control valve 36 places port 28A of hydraulic cylinder 26 in fluid communication with line 16 of system 10 via line 32. In FIG. 1B, control valve 36 places port 28A in fluid communication with return line 37, which fluidly communicates with source 18 of fluid 14 or another portion of system 10 at a lower pressure than the pressure of line 16 upstream from metering valve 22. In this case, return line 37 contains fluid at pressure P1. A third position of control valve 36 isolates port 28A from both line 16 and return line 37 to retain fluid 14 within hydraulic cylinder 26.

Along line 34 and between hydraulic cylinder 26 and line 16, orifice 38 is used to produce a pressure change associated with the flow of fluid 14 along line 34. For this purpose, pressure transducer 40 includes ports 42A and 42B placing pressure transducer 40 in fluid communication with line 34 on opposite sides of orifice 38 for measuring a differential pressure across orifice 38. In the present configuration, a single pressure transducer is used in a configuration for producing signal S1, which is indicative of the differential pressure directly. However, in other instances, the differential pressure measurement can be implemented using separate pressure transducers 40. One pressure transducer 40 measures the pressure of fluid 14 within line 34 via port 42A, and the other pressure transducer 40 measures the pressure of fluid 14 within line 34 via port 42B. Each pressure transducer 40 produces signal S1 representative of respective pressures of fluid 14. Subsequently, the differential pressure across orifice 38 can be determined from the difference of signals S1.

Orifice 38 is selected to have a discharge coefficient, $C_d$, that is approximately constant over a range of Reynolds numbers associated with flow conditions of fluid 14 expected within densimeter 12. To achieve consistent results for a particular application, changes in discharge coefficient, $C_d$, of orifice 38 are minimized within expected operational condition ranges (i.e., mass flow rates W, temperature T, and pressure P) and properties of fluid 14 (i.e., density and viscosity). Examples of orifice 38 include orifices with rounded interior edges instead of sharp edges. Other examples of orifice 38 include tapered or convergent orifices. Some embodiments of orifice 38 have identical geometry on each side of the orifice to facilitate flow through orifice 38 in both directions.

Piston 30 linearly translates within hydraulic cylinder 26 in response to pressure conditions of fluid 14 at ports 28A and 28B. As shown in FIGS. 1A and 1B, piston 30 includes first and second piston heads 44A and 44B spaced from each other along an actuation direction of piston 30. Each piston head 44A, 44B translates within respective bores 46A and 46B of hydraulic cylinder 26. A cross-sectional area of piston head 44A communicating with port 28A is larger than a cross-sectional area of piston head 44B communicating with port 28B to facilitate actuation of piston 30 towards port 28B as described in further detail below. Additionally, hydraulic cylinder 26 can include port 28C placing a region of hydraulic cylinder 26 between piston heads 44A, 44B in fluid communication with line 48. Line 48 may communicate with a portion of system 10 at pressure P3—pressure lower than pressure P2 within line 16 and, in some cases, equal to pressure P1.

Sensor 50 monitors movement of piston 30 and provides signal S2 indicative of the position, velocity, or both position and velocity of piston 30 to controller 52. In some instances, sensor 50 is a position sensor (e.g., a linear variable displacement transducer or LVDT) in which signal S2 represents the time-varying position of piston 30 relative to a stationary housing of hydraulic cylinder 26. In other instances, sensor 50 can be a velocity sensor in which signal S2 represents the direction and velocity of piston 30. In each case, signal S2 is used to provide or calculate a velocity of piston 30 to controller 52 as feedback.

System 10 can include one or more other sensors 51 that measure a temperature T or a pressure P of fluid 14. For instance, system 10 can include sensor 51A (e.g., a thermocouple, or other temperature-sensing device) positioned upstream of metering valve 22 that outputs signal S3 indicative of the temperature T of fluid 14 within line 16. Additionally, system 10 can include sensor 51B (e.g., a pressure transducer) to output signal S4 indicative of the pressure P of fluid 14 within line 16 at a location upstream from metering valve 22. The piston feedback signal S2, pressure and temperature signals S3 and S4, as well as one or more signals 51 from pressure transducer 40 indicative of differential pressure across orifice 38 are received by controller 52.

Controller 52, in some examples, includes one or more processors 54 and computer-readable memory 56, and communications interface 57 for receiving sensory input or other data and transmitting control signals to components of densimeter 12 and/or components of system 10. Where system 10 is a fuel system of a gas turbine engine, controller 52 can be implemented as a discrete control unit within a gas turbine engine or it can be incorporated into or integrated with an electric engine controller (EEC), an engine control unit (ECU), full-authority digital engine (or electronics) control (FADEC), or other engine controller.

Processor or processors 54 can include any one or more of a microprocessor, a digital signal processor (DSP), an application specific integrated circuit (ASIC), a field-programmable gate array (FPGA), or other equivalent discrete or integrated logic circuitry.

Computer-readable memory 56 can be configured to store information within controller 52 during operation. Computer-readable memory, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory of controller 52 can include temporary memory, meaning that a primary purpose of the computer-readable memory is not long-term storage. Computer-readable memory of controller 52, in some examples, can be described as a volatile memory, meaning that the computer-readable memory does not maintain stored contents when electrical power to controller 52 is removed. Examples of volatile memories can include random access memories (RAM), dynamic random access memories (DRAM), static random access memories (SRAM), and other forms of volatile memories. In some examples, computer-readable memory can be used to store program instructions for execution by one or more processors 54 of controller 52. For instance, computer-readable memory 56 of controller 52 can be used by software or applications executed by controller 52 to temporarily store information during program execution. Accordingly, controller 52 can be encoded with instructions that, when executed by the one or more processors, cause controller 52 and/or other elements of densimeter 12 and/or system 10 to operate in accordance with techniques described herein.

Figure 2:
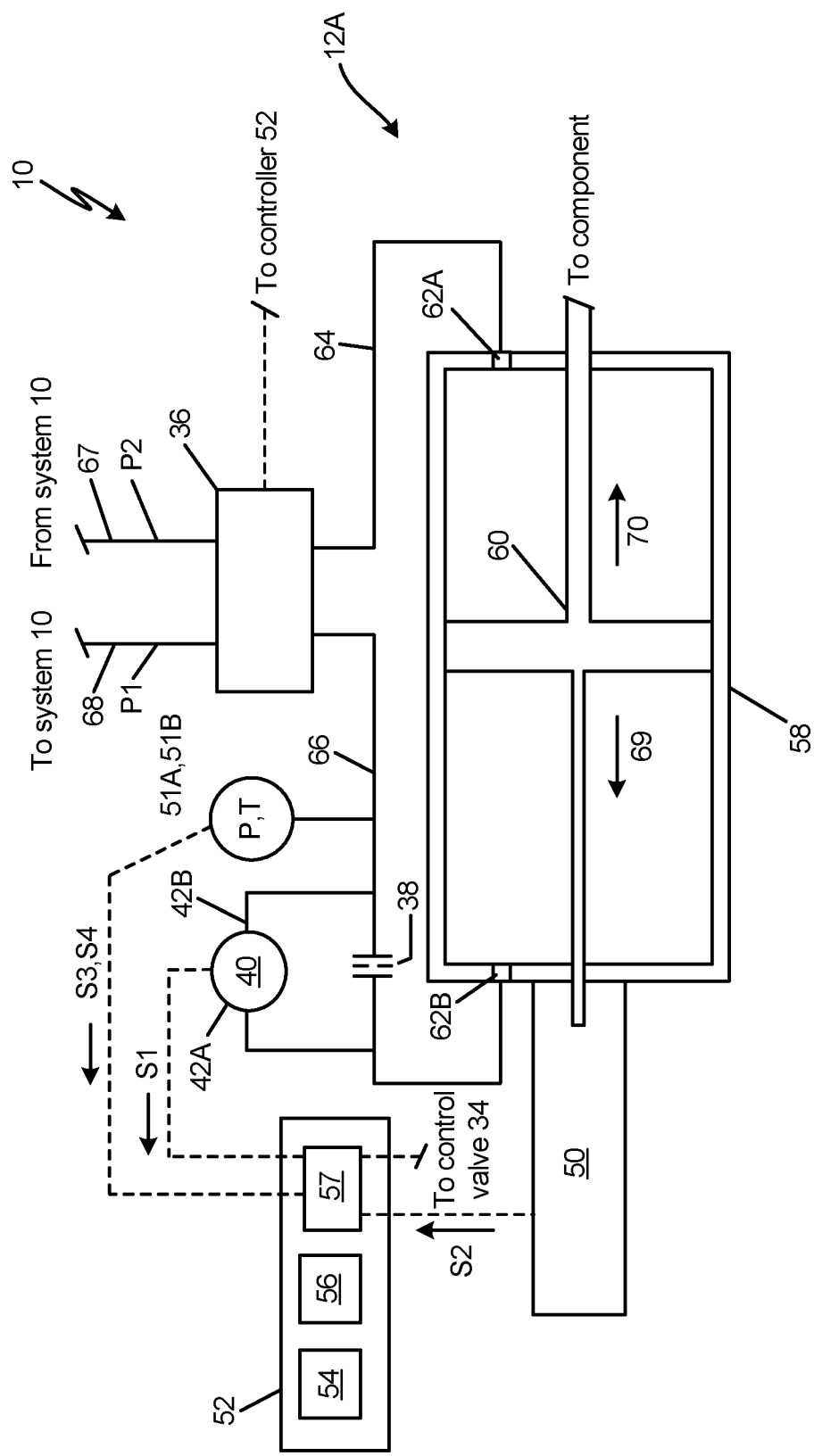
FIG. 2 is a schematic representation of a system in which the densimeter includes an actuator.

FIG. 2 depicts densimeter 12A incorporated into system 10 in which hydraulic actuator 58 replaces hydraulic cylinder 26. In this configuration, piston 60 translates within actuator 58 to perform useful work. Example applications for actuator 58, where system 10 is a fuel system of a gas turbine engine, include actuation of compressor inlet guide vanes, variable stator vanes, and compressor bleed valves, among other potential uses. Like hydraulic cylinder 26, actuator 58 includes ports 62A and 62B fluidly communicating with opposite sides of piston 60. Line 64 fluidly communicates between system 10 and port 62A while line 66 fluidly connects port 62B to system 10. Densimeter 12A includes orifice 38, pressure transducer 40, and one or more sensors 51 (e.g., temperature sensor 51A and/or pressure transducer 51B), each positioned along line 66 between port 62B and system 10 and function in the same manner described in reference to densimeter 12 of FIGS. 1A and 1B. Likewise, sensor 50 interfaces with piston 60 to provide feedback signal S2 along with signals S1, S3, and S4 to controller 52 as previously described.

In this case, control valve 36 communicates with both lines 64 and 66 and, as such, can be configured as a three-position, four-port proportional or servo valve. In a first position, high pressure P2 communicates with port 62A of actuator 58 via line 64 and high-pressure line 67, and low pressure P1 communicates with port 62B of actuator 58 via line 66 and low-pressure line 68, which drives piston 60 towards port 62B as indicated by direction arrow 69. A second position of control valve 36 fluidly connects high pressure P2 to port 62B via line 66 and high pressure line 67. Additionally, the second position of control valve 36 fluidly connects low pressure P1 to port 62A via line 64 and low-pressure line 68. In this state, the fluid pressure at ports 62A and 62B drive piston 60 towards 62A as indicated by direction arrow 70. In both situations, fluid 14 is driven through orifice 38 in accordance with the actuation direction 68 or 70. In a third position, control valve 36 may isolate lines 64 and 66 from system 10.

Figure 3:
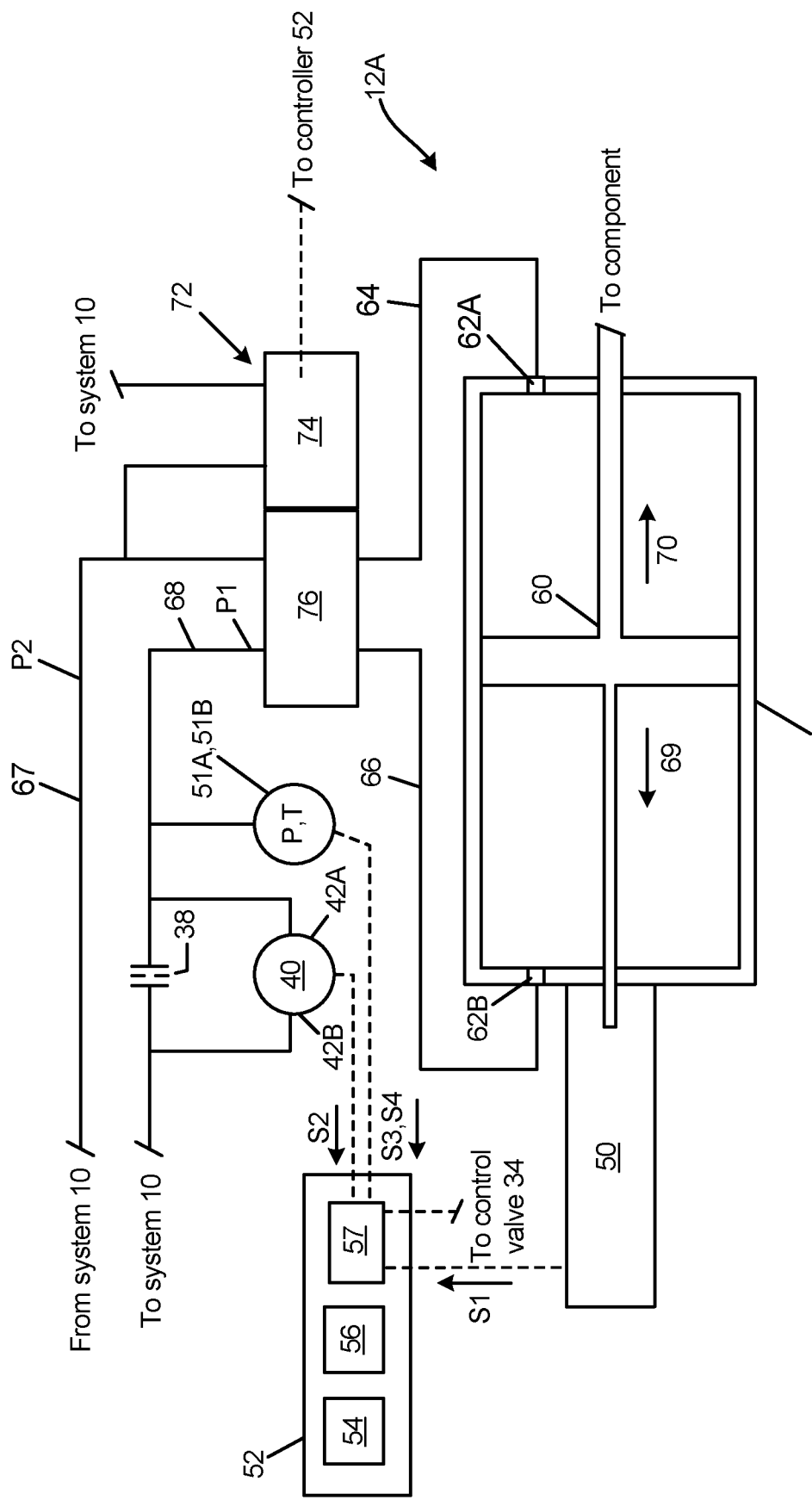
FIG. 3 is a schematic representation of a system in which the densimeter includes an actuator and a two-stage control valve.

FIG. 3 depicts another variation in which densimeter 12A is actuated by a two-stage control valve 72 in place of control valve 36. First stage 74 of control valve 72 includes an electrically-actuated piston that directs fluid 14 at high pressure P2 to second stage 76 of control valve 72. Within second stage 76, a valve element moves between three positions. In the first position, fluid 14 at high pressure P2 communicates with port 62A via line 64 and high-pressure line 67. The first position of second stage 76 also places fluid 14 at low pressure P1 in fluid communication with port 62B via line 66 and low-pressure line 68. When second stage 76 is in the first position, fluid pressure drives piston 60 of actuator 58 towards port 62B as indicated by arrow 69. In a second position, fluid 14 at high pressure P2 communicates with port 62B via line 66 and high-pressure line 67 while fluid at low pressure P1 communicates with port 62A via line 64 and low-pressure line 68. In the second position, fluid pressure drives piston 60 towards port 62A as indicated by arrow 70. In either position, piston 60 drives fluid 14 through orifice 38, which is positioned downstream from second stage 76. In a third position, ports 62A and 62B are isolated from system 10, preventing communication of fluid 14 to actuator 58. In addition to incorporating densimeter 12A into system 10 by utilizing actuators 58 of system 10, the densimeter of FIG. 3 also locates orifice 38, pressure transducer 40, and sensors 51 along line 68, which remains within low-pressure region of system 10 irrespective of control valve 72 position. As such, the design pressures for orifice 38, pressure transducer 40, and sensors 51 can be lower, increasing component life.

Figure 4:
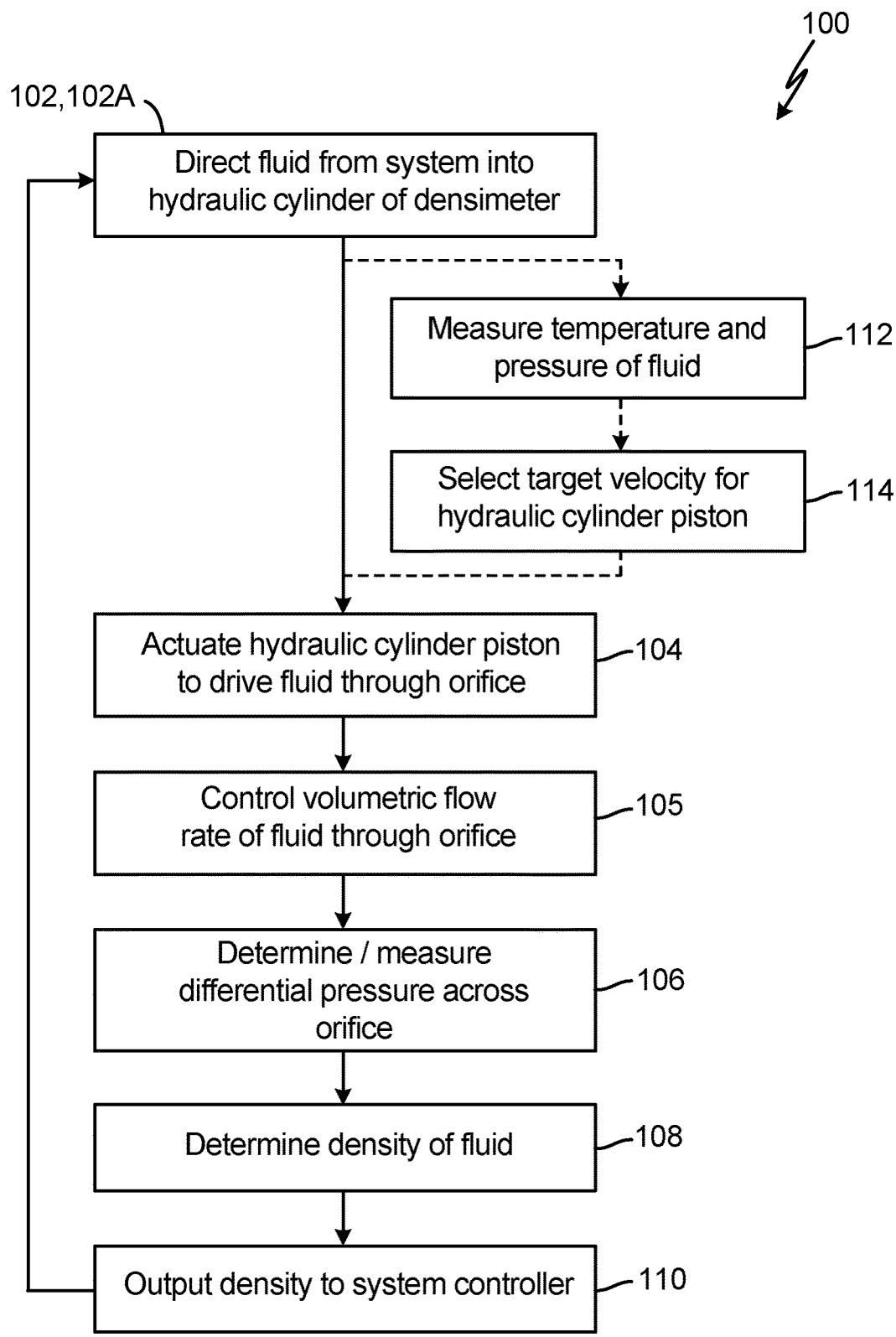
FIG. 4 is a flow chart describing a methodology of determining a density of a fluid of a system.

FIG. 4 is a flowchart depicting steps of method 100 for measuring density p of fluid 14 during operation of system 10 using densimeter 12 or densimeter 12A. Steps of method 100 can be implemented as a series of instructions, software, an application, and/or routine stored by computer-readable memory 56 and executed by processor 54. Method 100 can include steps 102, 104, 106, 108, 110, 112, and 114. However, the sequence described below and depicted by FIG. 4 is for illustrative purposes only and is not meant to limit method 100 in any way as it is understood that the portions of the method can proceed in a different logical order, additional or intervening portions can be included, or described portions of the method can be divided into multiple portions, or described portions of the method can be omitted without detracting from the described above.

In step 102, controller 52 periodically, or upon receiving a request from an operator of system 10, causes a piston of a hydraulic cylinder or an actuator to displace. Referring to densimeter 12 depicted by FIG. 1A, controller 52 actuates hydraulic cylinder 26 by commanding control valve 36 to move to a first position, fluidly connecting port 28A to line 16 of system 10. With control valve 36 permitting fluid communication between port 28A and line 16, fluid 14 from line 16 flows through line 32 into hydraulic cylinder 26 to interact with piston head 44A. Similarly, densimeter 12A generally depicted by FIGS. 2 and 3 utilizes actuator 58, which is periodically commanded to translate under normal operation to perform useful work. In the case of a gas turbine engine fuel system, actuator 58 periodically translates during operation of the gas turbine engine to change position of a variable geometry component as discussed above. This may be accomplished by controller 52 actuating control valve 36 to fluidly connect port 62A to high-pressure region of system 10 while simultaneously placing port 62B in fluid communication with a low-pressure region of system 10 such that high pressure fluid 14 interacts with piston 60 via port 62A.

In step 104, piston 30 of hydraulic cylinder 26, or piston 60 of actuator 58, translates stroke length L under action of pressure P2. For densimeter 12, fluid 14 flowing through port 28A interacts with piston head 44A and, because its cross-sectional area is larger than the cross-sectional area of piston head 44B, translates piston 30 in direction 78 towards port 28B as depicted in FIG. 1A. In the case of actuator 58, the cross-sectional areas of opposite sides of piston 60 are similar, differing only when the piston shaft sizes differ. However, because control valve 36 simultaneously connects one of ports 62A, 62B with high pressure region of system 10 and the other of ports 62A, 62B to low pressure region of system 10, piston 60 translates from the high-pressure side towards the low-pressure side. For instance, connecting port 62A with high pressure and connecting port 62B with low pressure of system 10 translates piston 60 towards port 62B. The distance piston 30 or piston 60 translates, or stroke length L, may be constant, remaining unchanged for each actuation cycle. In other embodiments, stroke length L may be variable. For example, stroke length L can be varied to equate actuation cycle times in applications where the actuation velocity of piston 30 or piston 60 is selected based on steps 112 and 114 discussed below. As the target velocity of piston 30 or piston 60 increases, stroke length L decreases proportionally to maintain the same actuation cycle time, or the time required to traverse stroke length L.

In step 105, controller 52 may regulate the actuation velocity u of hydraulic cylinder 26 or actuator 58 and thereby regulate the volumetric flow rate Q of fluid 14 flowing through orifice 38. Using signal S2 received by controller 52 from sensor 50, controller 52 may vary a valve position of control valve 36 to maintain piston 30 or piston 60 at a desired target velocity. For instance, controller 52 may utilize a proportional control loop, proportional-integral control loop, or proportional-integral-differential control loop as is known in the art to maintain piston 30 or piston 60 at a target velocity during actuation.

Displacement of hydraulic cylinder 26, or actuator 58, displaces fluid 14 through orifice 38 during which controller 52 determines volumetric flow rate Q and differential pressure $P_1$-$P_2$ of fluid 14 flowing through orifice 38 in step 106. Volumetric flow rate Q can be determined from equation 1 in which $A_p$ is the cross-sectional area and u is the velocity of the piston of hydraulic cylinder 26 or actuator 58. While the cross-sectional area $A_p$ of piston 30 or piston 60 is known, piston velocity u is determined based on signal S2 received by controller 52 from sensor 50. Where sensor 50 is a velocity sensor, signal S2 is directly proportional to piston velocity and can be determined directly. In instances where sensor 50 is a position sensor, piston velocity u can be determined from the time derivative dx/dt of the position signal (i.e., dx/dt, where x is piston position and t is time), and when sensor 50 is an accelerometer, piston velocity u can be determined from the integral of signal S2, which in this case, is proportional to piston acceleration.

$$Q = A_p u \qquad \text{Equation 1}$$

Subsequently in step 108, controller 52 determines density p of fluid 14 based on volumetric flow rate Q of fluid 14 and differential pressure $P_1$-$P_2$ across orifice 38. For this purpose, density p can be calculated in accordance with equation 2, where p is the density of fluid 14, k is a unit conversion constant, $C_d$ is the discharge coefficient of orifice 38, A is the minimum cross-sectional area of orifice 38, $P_1$ is the static pressure of fluid 14 upstream from orifice 38, $P_2$ is the static pressure of fluid 14 downstream from orifice 38, $P_1$-$P_2$ is the differential pressure across orifice 38, and Q is the volumetric flow rate of fluid 14 passing through orifice 38.

$$\rho = k^2 C_d^2 A^2 \frac{(P_1 - P_2)}{Q^2} \qquad \text{Equation 2}$$

In step 110, controller 52 outputs density of fluid 14 to a corresponding controller of system 10, or where controller 52 is integrated with the system controller, outputs density of fluid 14 to a control algorithm or routine of system 10 where it is used to control mass flow rate W of fluid 14 flowing through system 10.

Rather than actuating hydraulic cylinder 26 or actuator 58 in the direction described by step 102, the pistons can be actuated in an opposite direction as described by step 102A. Actuating hydraulic cylinder 26 or actuator 58 in this way can be selected to initiate another density measurement procedure as described above, this time in the opposite direction, or to reset densimeter 12 and 12A for a subsequent density determination.

In this case, controller 52 causes hydraulic cylinder 26 or actuator 58 to actuate in a second direction that is opposite the actuation direction described by steps 102, 104, 106, 108, and 110. For instance, control valve 36 of densimeter 12 can be actuated to a second position depicted by FIG. 1B whereby port 28A is fluidly connected to return line 37 containing fluid 14 at pressure $P_1$, a lower pressure than pressure $P_2$ of fluid 14 contained within line 16. Since fluid 14 at port 28B of hydraulic cylinder 26 fluidly communicates with an inlet of metering valve 22, fluid 14 is at high pressure $P_2$, which exceeds lower pressure $P_1$ by an amount sufficient to actuate piston 30 in direction 70 in view of geometry of piston heads 44A and 44B. Under action of piston 30, fluid 14 flows through orifice 38 and into port 28B of hydraulic cylinder 26 while discharging from hydraulic cylinder 26 via port 28A into line 37.

Turning to densimeter 12A depicted by FIG. 2, control valve 36 actuates to a second position connecting port 62B to high pressure fluid region of system 10 via lines 66 and 67 while simultaneously connecting port 62A to low pressure fluid region of system 10 via lines 64 and 68. Under action of high-pressure fluid, piston 60 translates towards port 62A, drawing fluid 14 through orifice 38 and into actuator 58 through port 62B via line 66. Similarly, for densimeter 12A using the multi-stage control valve depicted by FIG. 3, second stage 76 is actuated into a second position by first stage 74 of control valve 72. In the second position, control valve 72 fluidly connects port 62B to high-pressure fluid region of system 10 via lines 66 and 67 while fluidly connecting port 62A to low-pressure region of system 10 via lines 64 and 68, which drives piston towards port 62A. However, because orifice 38 is positioned along low-pressure line 68, fluid 14 flows through orifice 38 in the same direction as previously described despite the actuation direction of piston 60. In each case, steps 104, 105, 106, 108, and 110 can be repeated to determine density p as previously described.

Optionally, method 100 may include steps 112 and 114 to determine the desired target velocity u. In step 112, controller 52 can receive signal S3 indicative of the temperature T of fluid 14 within system 10 and signal S4 indicative of the pressure P of fluid 14 within system 10. For example, the fluid pressure P and the temperature T can be taken within line 16 upstream from metering valve 22 as shown by FIGS. 1A and 1B (i.e., a high-pressure region of system 10). Alternatively, the fluid temperature T and the fluid pressure P can be measured in proximity to orifice 38, in this case, along line 68 as shown in FIGS. 2 and 3 (i.e., a low-pressure region of system 10).

For an implemented system, the orifice can be characterized for its discharge coefficient $C_d$ as a function of the temperature and the pressure of fluid 14 to increase accuracy. In addition, the discharge coefficient $C_d$ for orifice 38 is often expressed as a function of Reynolds number, and the discharge coefficient $C_d$ can be more or less sensitive to Reynold's number depending on the orifice design. Regardless of the sensitivity, knowledge of the Reynold's number, controlling the Reynold's number, or both can be useful to increase the accuracy of the system. Providing a consistent and accurate density determination from densimeter 12 or 12A leads to the ability to select a target Reynolds number within a Reynolds number range associated with a constant discharge coefficient $C_d$ or a minimal change in discharge coefficient $C_d$. Using the target Reynolds number and the kinematic viscosity v of fluid 14 determined from measured fluid pressure P and fluid temperature T, target velocity u can be determined in step 114 according to equation 3. Referring to equation 3, Re is the selected Reynolds number, v is the kinematic viscosity of fluid 14, and D is a characteristic depending on geometry. For an enclosed fluid path, the geometric characteristic D is the hydraulic diameter D. Subsequently, steps 104, 105, 106, 108, and 110 of method 100 may proceed as previously described.

$$Re = \frac{uD}{v} \qquad \text{Equation 3}$$

Using method 100, the speed of the valve can be changed if desired to keep the Reynold's number constant or to minimize the Reynold's number range. For example, if the ratio of the fluid density to the fluid dynamic viscosity decreased by 30% from the hot fluid to the cold fluid case, the piston could be actuated (i.e., slewed) at a 30% higher target velocity for the cold condition to compensate. In addition, the piston could be actuated at different target velocities to take multiple readings, and the resulting data could be used to solve n equations with n unknowns to further increase the knowledge of the fluid properties like viscosity, temperature, density, etc., thereby increasing the accuracy of the system.

Discussion of Possible Embodiments

The following are non-exclusive descriptions of possible embodiments of the present invention.

A method of determining a density of fluid within a system includes, among other possible things, actuating a piston of a hydraulic cylinder in a first direction at a target velocity. The method additionally includes determining, based on the fluid flowing through an orifice under actuation of the piston in the first direction, a first differential pressure and a first volumetric flow rate and determining a first density of the fluid based on the first differential pressure and the first volumetric flow rate of the fluid. According to the method, a mass flow rate of fluid within the system is regulated based on the first density.

The method of the preceding paragraph can optionally include, additionally and/or alternatively, any one or more of the following features, configurations and/or additional components.

A further embodiment of the foregoing method can include receiving a feedback signal indicative of a position or a velocity of the piston.

A further embodiment of any of the foregoing methods can include varying a position of a control valve based on the feedback signal to maintain the target velocity.

A further embodiment of any of the foregoing methods can include determining the first volumetric flow rate of the fluid based on a cross-sectional area of the piston and the target velocity.

A further embodiment of any of the foregoing methods can include determining the target velocity based on a coefficient of discharge of the orifice.

A further embodiment of any of the foregoing methods can include measuring a pressure and a temperature of the fluid within the system.

A further embodiment of any of the foregoing methods can include determining the target velocity based on the coefficient of discharge of the orifice, the pressure of the fluid, and the temperature of the fluid.

A further embodiment of any of the foregoing methods can include varying a stroke length of the piston based on the target velocity.

A further embodiment of any of the foregoing methods, wherein actuating the piston of the hydraulic cylinder in the first direction can include actuating a control valve to a first position, wherein the first position connects a first port of the hydraulic cylinder to a first line of the system within which a fluid pressure is higher than a fluid pressure within a second line of the system.

A further embodiment of any of the foregoing methods can include actuating the control valve to a second position, wherein the second position places the first port in fluid communication with the second line of the system.

A further embodiment of any of the foregoing methods can include actuating the piston of the hydraulic cylinder in a second direction opposite the first direction.

A further embodiment of any of the foregoing methods, wherein actuating the piston of the hydraulic cylinder in the first direction and the second direction can include regulating a flow of fluid flowing to or from the first port of the hydraulic cylinder by varying a position of the control valve between the first position and the second position.

A further embodiment of any of the foregoing methods, wherein the first position of the hydraulic cylinder can place the first port of the hydraulic cylinder in fluid communication with the first line of the system and can place a second port of the hydraulic cylinder in fluid communication with the second line.

A further embodiment of any of the foregoing methods, wherein the second position of the hydraulic cylinder can place the first port in fluid communication with the second line of the system and can place the second port in fluid communication with the first line of the system.

A further embodiment of any of the foregoing methods can include directing fluid from the system to the hydraulic cylinder to actuate the piston.

A further embodiment of any of the foregoing methods, wherein directing the fluid from the system to the hydraulic cylinder to actuate the piston can include extracting fluid from the system upstream from a metering valve.

A further embodiment of any of the foregoing methods can include discharging fluid through the orifice to the system upstream of the metering valve.

A further embodiment of any of the foregoing methods can include actuating the piston of the hydraulic cylinder in a second direction at the target velocity, wherein the second direction is opposite the first direction.

A further embodiment of any of the foregoing methods can include determining, based on the fluid flowing through the orifice under actuation of the piston in the second direction, a second differential pressure and a second volumetric flow rate.

A further embodiment of any of the foregoing methods can include determining a second density of the fluid based on the second differential pressure and the second volumetric flow rate of the fluid.

A further embodiment of any of the foregoing methods can include regulating the mass flow rate of fluid within the system based on the first density and the second density.

A further embodiment of any of the foregoing methods, wherein actuating the piston in the first direction and the second direction can include selectively actuating a control valve between a first position and a second position, wherein the first position places a first port of the hydraulic cylinder in fluid communication with a first line and places a second port of the hydraulic cylinder in fluid communication with a second line in which fluid within the first line is at a higher pressure than fluid within the second line, and wherein the second position places the first port of the hydraulic cylinder in fluid communication with the second line and places the second port in fluid communication with the first line.

A further embodiment of any of the foregoing methods, wherein the orifice can be positioned along the second line such that actuating the piston in the first direction flows fluid through the orifice in the same direction as actuating the piston in the second direction.

A system for determining a density of a fluid within the system includes a hydraulic cylinder comprising a piston, an orifice fluidly connected to the hydraulic cylinder, a pressure transducer arranged to determine a differential pressure across the orifice, and a controller comprising a processor and computer readable memory encoded with instructions that, when executed by the processor, cause the system to perform any of the foregoing embodiments of the method.

The system of the preceding paragraph can optionally include, additionally and/or alternatively, any one or more of the following features, configurations and/or additional components.

A further embodiment of the foregoing system can include a first piston head and a second piston head spaced from and joined to the first piston head, wherein the cross-sectional area of the first piston head is larger than the cross-sectional area of the second piston head.

A further embodiment of any of the foregoing systems can include a control valve fluidly communicating with the hydraulic cylinder.

A further embodiment of any of the foregoing methods can include a sensor connected to the controller.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A method of determining density of a fluid within a system comprising a line fluidly connecting, in series, a fluid source, a metering valve, and a fluid destination, the method comprising:
   actuating a piston of a hydraulic cylinder in a first direction at a target velocity, wherein the hydraulic cylinder includes a first port and a second port on opposite sides of the piston, and wherein the first port and the second port are fluidly connected to the line to receive fluid and to discharge fluid;
   determining, based on the fluid flowing through an orifice under actuation of the piston in the first direction, a first differential pressure;
   receiving a first feedback signal indicative of a first actuation velocity of the piston;
   determining a first volumetric flow rate based on the first actuation velocity and a cross-sectional area of the piston;
   determining a first density of the fluid based on the first differential pressure, the first volumetric flow rate, and a discharge coefficient of the orifice; and
   regulating, using the metering valve, a mass flow rate of fluid within the system based on the first density.

2. The method of claim 1, further comprising:
   varying a position of a control valve based on the feedback signal to maintain the actuation velocity at the target velocity.

3. The method of claim 1, further comprising:
   determining the target velocity based on a coefficient of discharge of the orifice.

4. The method of claim 3, further comprising:
   measuring a pressure and a temperature of the fluid within the system; and
   determining the target velocity based on the coefficient of discharge of the orifice, the pressure of the fluid, and the temperature of the fluid.

5. The method of claim 4, further comprising:
   varying a stroke length of the piston based on the target velocity.

6. The method of claim 1, wherein actuating the piston of the hydraulic cylinder in the first direction includes:
   actuating a control valve to a first position, wherein the first position places a first port of the hydraulic cylinder in fluid communication with a first line of the system within which a fluid pressure is higher than a fluid pressure within a second line of the system.

7. The method of claim 6, further comprising:
   actuating the control valve to a second position, wherein the second position places the first port in fluid communication with the second line of the system; and
   actuating the piston of the hydraulic cylinder in a second direction opposite the first direction.

8. The method of claim 7, wherein actuating the piston of the hydraulic cylinder in the first direction and the second direction includes:

regulating a flow of fluid flowing to or from the first port of the hydraulic cylinder by varying a position of the control valve between the first position and the second position.

9. The method of claim 6, wherein the first position of the hydraulic cylinder places the first port of the hydraulic cylinder in fluid communication with the first line of the system and places a second port of the hydraulic cylinder in fluid communication with the second line.

10. The method of claim 7, wherein the second position of the hydraulic cylinder places the first port in fluid communication with the second line of the system and places the second port in fluid communication with the first line of the system.

11. The method of claim 1, further comprising:
extracting the fluid from the system upstream from a metering valve.

12. The method of claim 11, further comprising:
discharging the fluid through the orifice to the system upstream of the metering valve.

13. The method of claim 1, further comprising:
actuating the piston of the hydraulic cylinder in a second direction at the target velocity, wherein the second direction is opposite the first direction;
determining, based on the fluid flowing through the orifice under actuation of the piston in the second direction, a second differential pressure;
receiving a second feedback signal indicative of a second actuation velocity of the piston;
determining a second volumetric flow rate based on the second actuation velocity and the cross-sectional area of the piston;
determining a second density of the fluid based on the second differential pressure and the second volumetric flow rate of the fluid; and
regulating, using the metering valve, the mass flow rate of fluid within the system based on the first density and the second density.

14. The method of claim 13, wherein actuating the piston in the first direction and the second direction include:
selectively actuating a control valve between a first position and a second position, wherein the first position places a first port of the hydraulic cylinder in fluid communication with a first line and places a second port of the hydraulic cylinder in fluid communication with a second line in which fluid within the first line is at a higher pressure than fluid within the second line, and wherein the second position places the first port of the hydraulic cylinder in fluid communication with the second line and places the second port in fluid communication with the first line.

15. The method of claim 14, wherein the orifice is positioned along the second line such that actuating the piston in the first direction flows fluid through the orifice in the same direction as actuating the piston in the second direction.

16. A system comprising:
a fluid source storing a fluid;
a fluid destination;
a metering valve;
a line fluidly connecting, in series, the fluid source, the metering valve, and the fluid destination;
a hydraulic cylinder comprising:
a piston;
a first port; and
a second port, wherein the first port and the second port are disposed on opposite sides of the piston, and wherein the first port and the second port are fluidly connected to the line to receive the fluid and to discharge the fluid;
an orifice fluidly connected between the line and the hydraulic cylinder;
a pressure transducer arranged to determine a differential pressure across the orifice;
a sensor; and
a controller comprising a processor and computer-readable memory encoded with instructions that, when executed by the processor, cause the system to:
actuate the piston of the hydraulic cylinder in a first direction at a target velocity;
determine, based on a fluid flowing through the orifice under actuation of the piston in the first direction, a first differential pressure;
receive, from the sensor, a feedback signal indicative of a velocity of the piston;
determine a first volumetric flow rate based on the feedback signal and a cross-sectional area of the piston;
determine a first density of the fluid based on the first differential pressure, the first volumetric flow rate, and a discharge coefficient of the orifice; and
regulate, using the metering valve, a mass flow rate of fluid within the system based on the first density.

17. The system of claim 16, wherein the piston comprises:
a first piston head and a second piston head spaced from and joined to the first piston head, wherein the cross sectional area of the first piston head is larger than the cross sectional area of the second piston head.

18. The system of claim 16, further comprising:
a control valve fluidly communicating with the hydraulic cylinder; and
wherein the computer-readable memory of the controller is encoded with instructions that,
when executed by the processor, cause the system to:
vary a position of the control valve based on the feedback signal to maintain the target velocity.

* * * * *